Dec. 12, 1950   L. A. KILLE   2,533,473
MOTOR SPEED CONTROL SYSTEM
Filed Nov. 6, 1948   3 Sheets-Sheet 1

INVENTOR
L. A. KILLE
BY
John A. Hall
ATTORNEY

Dec. 12, 1950  L. A. KILLE  2,533,473
MOTOR SPEED CONTROL SYSTEM
Filed Nov. 6, 1948  3 Sheets-Sheet 2

INVENTOR
L. A. KILLE
BY
John C. Hall
ATTORNEY

FIG.3.
READER CONTACT CLOSURE INTERVALS

| CONTACTS | ROTATIONAL POSITION IN DEGREES |
|---|---|
| A0,1,2<br>B0,1,2,4,7<br>C0,1,2,4,7<br>D0,1,2,4,7<br>E0,1,2,4,7<br>F0,1,2,4,7<br>G0<br>H0,1,2,4,5,6 | ←— .0408 SEC. —→ ←.0217 SEC.→<br>←——— ONE CYCLE ———→ |
| H3,7<br>K7 | |
| J5,6 | →.009←— .0408 SEC. —→ ←.0217 SEC.→<br>←——— ONE CYCLE ———→ |
| G1 | |
| G2 | |

Patented Dec. 12, 1950

2,533,473

UNITED STATES PATENT OFFICE 2,533,473

MOTOR SPEED CONTROL SYSTEM

Lindley A. Kille, Morristown, N. J., assignor to Bell Telephone Laboratories, Incorporated, New York, N. Y., a corporation of New York Application November 6, 1948, Serial No. 58,635

7 Claims. (Cl. 318—75)

This application relates to motor speed control systems and particularly to means for maintaining synchronism between two motor-driven devices.

An object of the invention is to provide means to hold two motor-driven devices in substantially exact synchronism. Where two motors each drive a device in a system where the two devices must be maintained at the same speed and at the same relative points in their cycles of operation, a means must be provided to continuously correct the speed of one relative to the speed of the other. Fundamentally, this is done by knowingly rendering one of the motors of slower speed than the other and then occasionally slowing the speed of the other under control of a circuit arrangement including a set of transfer contacts for each device continuously and periodically operating whereby any deviation from exact synchronism will close a circuit to a pulse summing or integrating device which in turn when operated will introduce a resistance into the circuit of the faster of the two motors.

In accordance with this invention and as a specific application of the principle involved, two readers of a tape comparer, such as that disclosed in my copending application Serial No. 44,130, filed August 13, 1948, are each operated by a 60-cycle alternating current induction motor. It has been found that by introducing a small resistance of about 41 ohms in series with such a motor the slip will be increased sufficiently to cause a definite and dependable difference in speed between it and a similar motor driving a similar device under like conditions. A resistor of greater value (96 ohms) is then placed in series with the faster motor but is normally held short-circuited so that it will tend to run faster.

A feature of the invention is the use of resistors in series with alternating current induction motors, of just sufficient size to produce a definte change in speed. A resistor is placed in series with a first motor to render it definitely slower than a second motor when this second motor has a direct connection to its source of power. The second motor also has a resistor in series with it, which is normally short-circuited, of a value to render it definitely slower than the first (slowed) motor. Synchronism is produced by changing the speed of the second motor by alternately closing and opening the short-circuit about its resistor so that it alternately speeds up and slows down, means being provided to limit the lead and the lag of the second motor to a definite, small and tolerable amount.

Each motor operates a reader, a device which has a plurality of pulsing contacts. A contact of each reader then operates a relay and the two relays each control a set of transfer contacts which are wired in a circuit so that when both relays are operated at the same time or both relays are released at the same time the circuit will be maintained open. However, if one relay in its periodical operation gets out of synchronism with the other then there will be periodical short closings of the circuit constituting a train of pulses. If the deviation from synchronism is very slight then the cycle consisting of one open period and one closed period is such that the percentage of the cycle occupied by the closed period is small whereas if the deviation from the synchronism is greater then the percentage of the cycle occupied by the closed period is great.

This circuit is then applied to an integration device which, in effect, operates only when this percentage of circuit closure has reached or exceeded a given or predetermined amount and which determines the tolerance of the operation of this synchronizing means. This integration means when operated opens the short-circuit about the resistance in series with the faster motor to slow it down until the deviation from synchronism is again within the tolerable limits.

In the operation of electromagnetic relays it is known that it takes a greater energization to operate a relay than it does to maintain it in operation. The action of the presently used integration device is similar, that is, it takes a given percentage of closed periods to operate the means but a lesser percentage to hold it operated. In the present arrangement, the periodical overlap of the relays operated by the two readers produces a train of pulses when the readers are in exact synchronism. If the integration device is not operated at this time these impulses are insufficient to operate it and consequently the resistor in series with the B reader motor will be short-circuited, and that motor will run faster than the A reader motor until it leads the A reader by an amount sufficient to increase the percentage closure to the point where the integration device responds. When that happens the short-circuit about the resistor in series with the B motor is removed and the B motor slows down, now running slower than the A reader motor. Although the percentage closure now decreases it is not until the two devices pass through exact synchronism and reach a point equally distant therefrom in the other direction that the integration device releases. When this release occurs then the resistance in series with the B reader motor is again short-circuited and the B reader motor speeds up, now running faster than the A reader motor. In this manner there is a periodical change of speed by the B reader motor so that the B reader alternately leads and lags the A reader by a substantially equal amount.

Since the tape comparer will operate satisfactorily when the two readers are out of phase by a substantial amount either side of synchronism, this motor speed control while not achieving constant exact synchronism is highly satisfactory and is an obviously economical means to employ.

A feature of the invention is an arrangement by which the relay operated by the slower motor is under control of a pulsing contact which operates later (about 9 milliseconds) in the cycle than the pulsing contact which operates a similar relay for the faster motor. By this expedient the operation and the release of the integrating device may be made to occur at equal points each side of exact synchronism between the motor-driven devices. In other words, the difference in timing of the pulses produced by the two different devices is equal to the tolerance in the operation of the integration device. By way of example, the difference in timing of the pulses of the two readers is as stated above, 9 milliseconds, and since the integration device will operate when this difference increases to 14 milliseconds or decreases to 4 milliseconds it, therefore, operates on a deviation of plus or minus 5 milliseconds.

The integration device may be of any conventional form. By way of example, a so-called slow-acting relay may be used, that is, a relay provided with a short-circuited secondary winding which will not respond to a train of pulses in which the pulse length is less than a given percentage of the cycle consisting of an open and a closed period. Further, by way of example, a relay in series with a condenser of given capacity may be employed and the pulse train applied to a point between the condenser and relay winding so that each pulse tends to discharge the normally charged condenser. In this conventional type circuit the relay will not respond until the potential built up across it has reached a given value and due to the proper and careful proportionings of the elements of this circuit this will not occur until the percentage closed period in this train of pulses has reached a predetermined value.

Another feature of the invention is a safety circuit, including the said speed control circuit which provides means for preventing the placing of the devices operated by said controlled motors into operation until synchronism has been certainly attained. The means to provide this feature consists of a circuit arrangement to short-circuit the resistor of the slower motor on a starting operation to insure a quick start, and to then remove this short-circuit as soon as synchronism has been attained but to still hold the devices out of use until after the first speed correcting pulse has been transmitted, thus guarding against placing the devices into operation in response to a fortuitous indication of synchronism.

Other features will appear hereinafter.

The drawings consist of three sheets having three figures as follows:

Fig. 3 is a chart showing the timing of the various reader contacts.

The present invention is a control system applied to the readers of the tape comparer disclosed in my copending application Serial No. 44,130, filed August 13, 1948.

The function of the device is mainly to compare two automatic accounting system tapes to determine whether or not they are identical as to content and position of all hole punchings. The function of the device with which we are at present concerned is to control the speed of the reader motors so as to quickly establish and maintain an "in-phase" relationship of the contacts of the two readers in order to provide maximum average speed of operation of the device in its comparing operations.

Another function of the apparatus is to insure an in-phase relationship of the contacts of the two readers before the "start" key is permitted to be effective.

The unit consists of a relay bay mounting a key and lamp control panel in addition to the necessary relays and apparatus for controlling two readers. The two readers are arbitrarily designated A and B and are mounted in adjacent cabinets. By means of this set-up, two automatic accounting system tapes may be checked for identity of all digits.

The function of the readers is to read the perforated information on the tape, to control the advance of the tape and to provide various closures for the controlling circuit.

Figure 1:
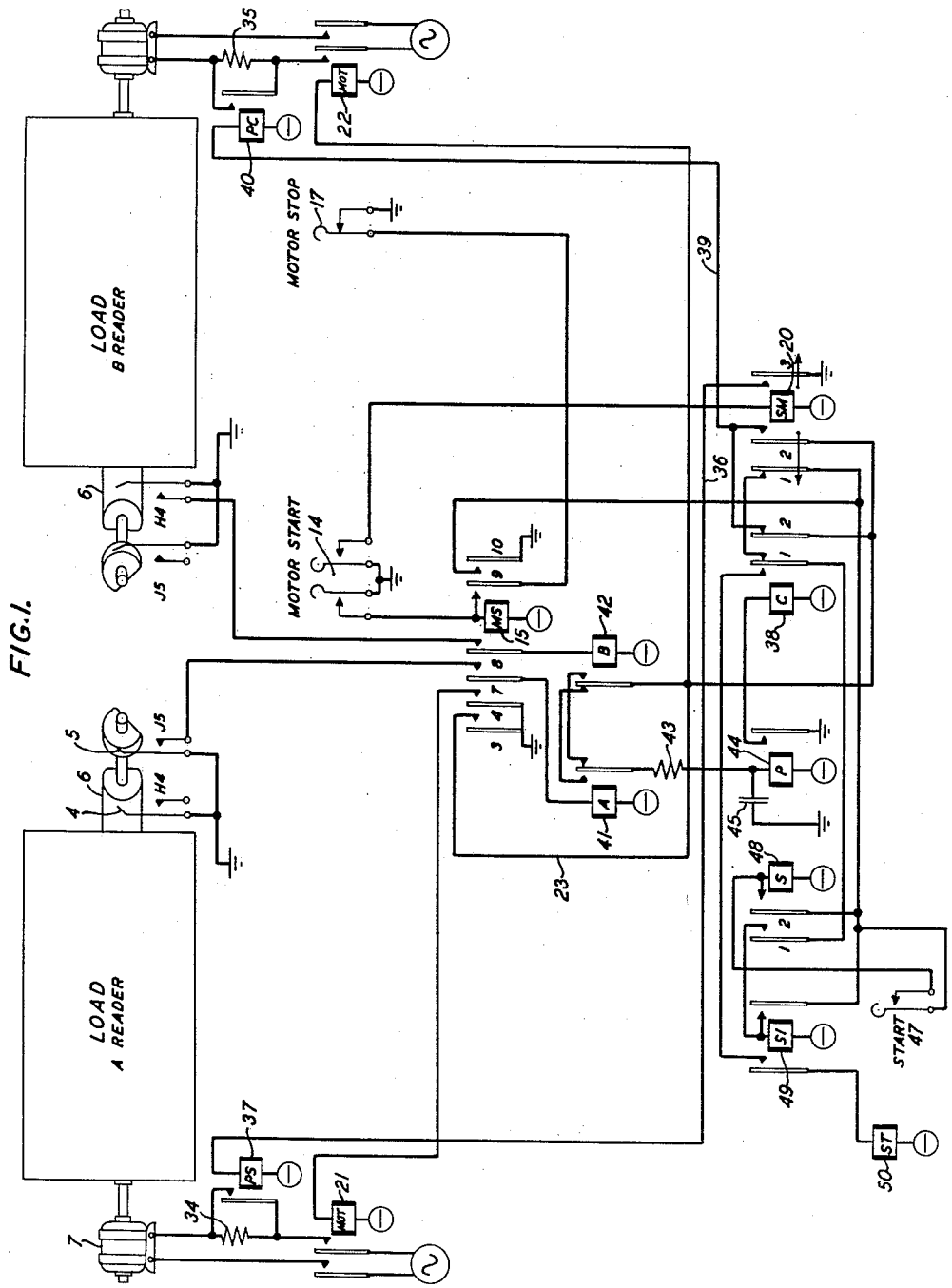
Fig. 1 is a schematic representation of the two readers and the motor control circuit.

The reader contains a rotatable perforated drum over which the automatic accounting system tape is carried together with motor-driven reading pins and control contacts such as the H4 contact 4 and the J5 contact 5 actuated by various cams. The reader is equipped with twenty-eight reading pins identified in Fig. 3 and included in the "Load" of Fig. 1 and which are arranged to line up with the holes in the drum and with the perforations on the tape. These pins are operated with a reciprocating motion from a cam 6 driven by the motor 7 and are arranged to make contact when registering with perforations in the tape. The reciprocating motion of the reading pins is dependent only upon the running of the reader drive motor 7 and is entirely independent of the rotation of the reader drum and the advance of the tape. Thus, if the advance of the drum is blocked, the same line on the tape is read repeatedly. The control contacts are actuated under control of the reader drive motor and close and open independently of the tape pattern. The timing and phasing of the reading and control contacts of each reader is shown in Fig. 3. All of the reading contacts and most of the H and K contacts make and break in synchronism, the make period being approximately twice the break period. Most of the J contacts make and break about 9 milliseconds after the reading contacts and are referred to as late makes. The reader drum advance takes place while the reading pins are withdrawn from the drum and all reader reading and make contacts are, therefore, open. Other disclosures of the reader with further description of its operation will be found in the copending application of W. W. Carpenter, Serial No. 666,280, filed May 1, 1946 and Patent No. 2,496,150, issued January 31, 1950.

DETAILED OPERATION

Starting motors

The motors are started by the operation of the motor start key 14. Through its left-hand contact, the motor start key causes the operation of the motor start relay 15 which locks through its front contact and armature 9, the contacts of the emergency motor stop key 17 to ground. Through its right-hand contacts the motor start key 14 extends ground to the winding of the SM relay 20 so that this relay operates only during the time that the motor start key 14 is held in operated position.

Upon the operation of the motor start relay 15 the motor relay 21 for the A reader is operated over the front contact and armature 4 of MS relay 15 and the motor relay 22 of the B reader is operated over the front contact and armature 3 of the MS relay and thence through a circuit over conductor 23, to the motor relay 22. These two motor relays will connect a source of alternating current to the two reader motors, respectively. While separate sources of alternating current have been shown in Figs. 1 and 3, it will be understood that these refer to a single source. Thus, the motors of the two readers are started. Both motors are induction type alternating current motors and tend to operate at constant speed, deviating only by slippage dependent on load, and capable of small variation by the insertion of resistance in the supply circuit.

The phase control means of the present invention provides for quickly bringing the readers to an approximately in-phase relationship of corresponding contacts after the motor start key is operated and released. This control is operated by connecting a series of resistance 34 in case of the A reader and 35 in case of the B reader in series with the induction motors driving the two readers. During normal operation the resistance 34 will be permanently in series with the motor 7 of the A reader and the resistance 35 will be periodically cut in series with the motor of the B reader. Under this condition the A reader will operate at a speed slightly lower than normal so that the B reader will run slightly faster than the A reader. This will continue until the B reader leads the A reader by a certain amount whereupon its resistance 35 will be cut in series with its motor and it will then slow down, now running slower than the A reader until it attains a lag by a certain amount.

When starting, the operation of the motor start key 14 in addition to the function described above also connects ground to temporarily operate the slow release SM relay 20. The SM relay closes a circuit from ground, its armature 3 and front contact, conductor 36 to operate the PS relay 37 to shunt the resistance 34 thus applying full voltage to motor 7 and inducing the motor 7 to run at its highest speed. In like manner, a circuit is established from ground, armature 3 and front contact of the MS relay 15, conductor 23, armature 2 and front contact of the SM relay 20 and in parallel therewith, armature 2 and back contact of the C relay 38, conductor 39 to operate the PC relay 40 which shunts the resistance 35 thereby applying full voltage to motor 36 and inducing the motor 36 to run at its highest speed. This is necessary to insure that these motors come up to speed quickly. When the motor start key 14 is released then the SM relay 20 releases, releasing the PS relay and permitting the PC relay to be controlled by the C relay 38. Relay SM is made slow to release to insure that the reader motors will come up to their normal speed in the case of short operations of the motor start key 14.

Figure 2:
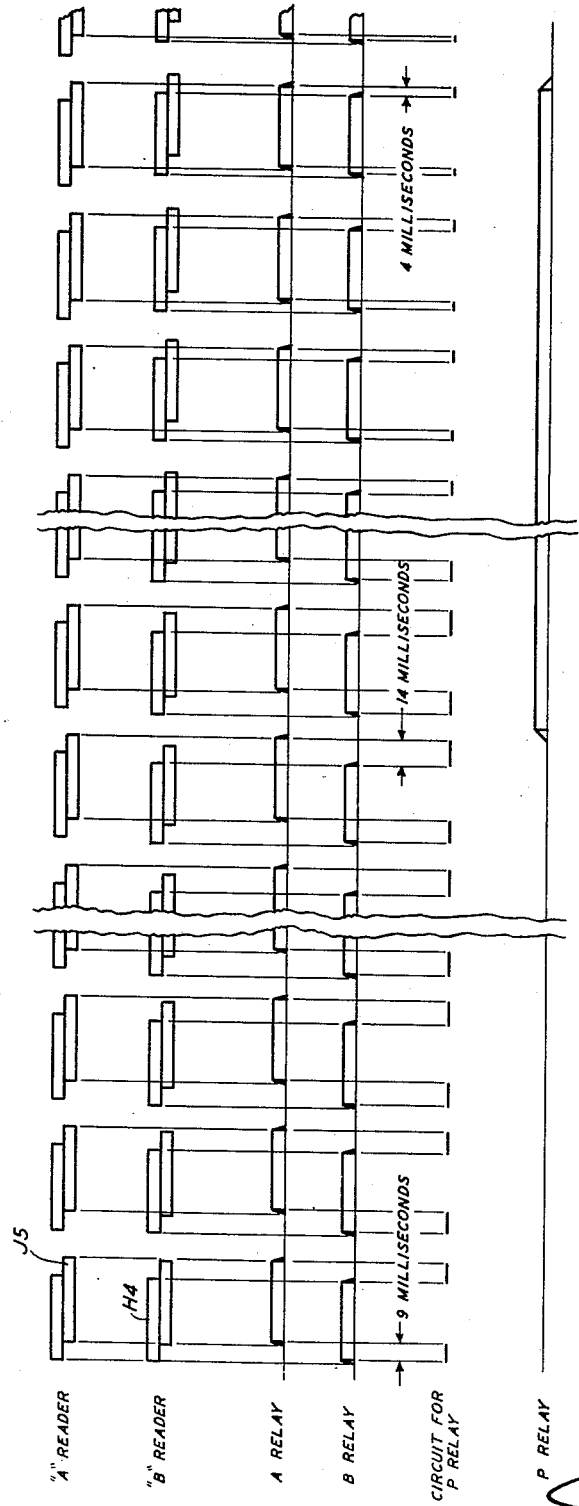
Fig. 2 is a sequence chart showing the manner in which reader B leads reader A until a predetermined point is reached whereupon reader B is slowed down until it lags behind reader A to another certain point.

As the readers operate, relays A and B operate and release under control of the contacts of the A and B readers. A circuit for the A relay may be traced from the J5 contact 5 of the A reader, front contact and armature 7 of the MS relay 15 through the A relay 41 to battery. In a similar manner, a circuit may be traced from the H4 contact of the B reader over the front contact and armature 8 of the MS relay 15 through the winding of the B relay 42. If the two readers are in exact synchronism then the A relay will operate and release about 9 milliseconds after the operation and release, respectively, of the B relay because the A relay is operated by a J contact and the B relay is operated by an H contact whose respective times of operation are shown in the reader contact closure interval chart, Fig. 3. A circuit may be traced from the ground on armature 3 of the MS relay 15 through its front contact, through the armature of the B relay 42, thence through a back and front contact network to the armature of the A relay 41, the resistance 43 to a circuit point leading in one direction through the winding of the P relay 44 and in the other direction through the condenser 45 to ground. It will be noted that as long as relays A and B are both operated or both released that this circuit will be open whereas if either deviates from this condition then the circuit will be closed. Thus, if the readers are in exact synchronism as shown in the beginning of the sequence chart, Fig. 2, there will be a 9-millisecond period during which this circuit is closed and during which time ground will be connected through the resistance 43 to attempt to discharge the condenser 45. The pulse frequency of these ground pulses is twice that of the normal reader contact frequency and the percent make of these pulses varies with the degree of the out-of-phase condition, being minimum when the J contacts of the A reader are nearly in phase with the H contacts of the B reader and maximum when these control contacts are out of phase. As the percent make of these pulses increases, the voltage of the charge on condenser 45 is lowered and as the percent make decreases the voltage is raised. The P relay 44 will be operated when the voltage difference between the main 50-volt battery supply to its winding and the voltage on condenser 45 is about 9 volts or greater which will normally occur whenever the regular make contacts of reader B are leading the late make contacts of reader A by approximately 14 milliseconds or more. Thus, as shown in Fig. 2 where the B reader is running faster than the A reader and where we have assumed the condition at the start of this chart to be when exact synchronism between the readers obtains, the percent make steadily increases until it changes from 9 milliseconds to 14 milliseconds whereupon the P relay becomes operated. When this happens then the PC relay 40 will be released and the resistance 35 inserted in series with the reader of the B motor so that this motor now slows down. Thus, the percent make will begin to decrease from 14 milliseconds until a low point of 4 milliseconds is reached whereupon the P relay will release to again cause the B reader to speed up. The P relay 44 operated, operates C relay 38. The C relay 38 operated releases the power control relay 40 which in turn removes the short-circuit from about resistance 35, thus connecting this resistance in series with the power circuit of the induction motor driving reader B. The resultant lowering of the voltage on this motor causes increased slippage and a slowing down of the B reader thus tending to move the regular make contacts of the reader B more nearly in phase with the late make contacts of reader A. The percent make of the pulses to the P relay 42 and the condenser 45 decreases thus allowing the voltage on condenser 45 to rise to the point where the P relay 44 releases. This will occur when the voltage difference between the 50-volt supply and the voltage on condenser 45 is approximately 5 volts or less and the regular make contacts of reader B are still leading the late make contacts of reader A by approximately 4 milliseconds. The release of P relay 44 releases the C relay 38 which in turn reoperates the power control relay 40. The PC relay 40 reoperated short-circuits resistance 35 once more applying the full voltage to the motor of reader B which causes this motor to speed up and again increase the out-of-phase relationship of the regular make contacts of reader B with respect to the late make contacts of reader A. The resulting decreased voltage on condenser 45 once more operates relay 44 and the control cycle is repeated thus maintaining the phase relationships of the two readers so that the B reader regular make contact pulses lead the A reader late make contact pulses by approximately 4 to 14 milliseconds. However, since the late make contacts of both readers normally lag the regular make contacts by approximately 9 milliseconds, all identical contacts of the two readers will normally be maintained in phase with the tolerance of approximately plus or minus 5 milliseconds. The approximate times quoted in the foregoing description will vary somewhat in operation due to variations of resistance and capacity, relay adjustment, voltage, reader and motor bearing friction, etc. but the two readers will be maintained so that identical contacts of readers A and B will be maintained in phase with each other in all cases within plus or minus 8 milliseconds. This degree of phase control is sufficient to maintain high speed operation of the comparer circuit.

*In-phase start*

Assume that the motor start key 14 has been operated and released and that the start key 47 has just been operated. The operation of the start key closes a circuit from ground, armature 10 and front contact of the MS relay 15, the contacts of the start key 47 to the winding of the S relay 48. The S relay 48 locks over its front contact and armature 2 to this ground independently of the contacts of start key 47. The S relay 48 also partially closes a circuit for operating the S1 relay 49 which may be traced from the winding of the S1 relay 49 through the front contact and armature 1 of the S relay 48, thence over the armature 1 of the C relay 38. When the SM relay 28 has released because of the release of the motor start key 14 the A, B and C relays start to function to control the phase relationships of the two readers as described hereinabove. When both the C relay 38 and the SM relay 28 are normal then the circuit through armature 1 of the C relay 38 is extended over the back contact and armature 1 of the SM relay 29 to ground on the front contact and armature 10 of the MS relay so that the S1 relay 49 operates. This locks directly to the ground which caused its operation independently of the circuit through the armatures and contacts of the C and SM relays. The S1 relay partially closes a circuit for operating the ST relay 50 from a make contact of the C relay 38. On the first subsequent operation of the C relay 38 due to the functioning of the phase control relays A and B the ST relay operates and performs the start functions (fully described in my copending application hereinabove referred to). Due to the fact that the ST relay cannot operate after the operation of the start key 47 until the C relay 38 has released and reoperated while under control of relays A and B the two readers will be approximately in phase. After the start key 47 is operated the total waiting time required for the start key to become effective in operating the ST relay 50 as described above in practice need not exceed 2 seconds.

Thus, the two readers are brought into phase automatically on starting and are held in phase within a practical tolerance throughout their operation.

What is claimed is:

1. In a system employing a pair of motor-driven devices which must operate in synchronism, a source of power, a motor for each said device operated from said source of power, means to hold said motors in synchronous operation, comprising a first resistor permanently in series with a first motor to render it definitely slower in operation than a second motor, a second resistor in series with a second motor, contacts for normally shunting said second resistor, a circuit periodically closed by said devices in response to a deviation from synchronism and an integration device responsive to the percentage length of the closures of said circuit for operating said contacts to adjust the speed of said second motor.

2. In a system employing a pair of motor-driven devices which must operate in synchronism, a source of power, a motor for each said device operated from said source of power, means to hold said motors in synchronous operation, comprising a first resistor permanently in series with a first motor to render it definitely slower in operation than a second motor, a second resistor in series with a second motor, contacts for normally shunting said second resistor, a pair of transfer contacts operated by each said device, a circuit controlled by said contacts maintained continuously open through synchronous operation of said contacts but closed periodically when the operation of said contacts deviates from synchronism and an integrating device responsive to the percentage closure of said circuit for operating said contacts to adjust the speed of said second motor.

3. In a system employing a pair of motor-driven devices which must operate in synchronism, a source of power, a motor for each said device operated from said source of power, means to hold said motors in synchronous operation, comprising a first resistor permanently in series with a first motor to render it definitely slower in operation than a second motor, a second resistor in series with a second motor, contacts for normally shunting said second resistor, a pair of transfer contacts operated by each said device, a circuit controlled by said contacts maintained continuously open through synchronous operation of said contacts but closed periodically when the operation of said contacts deviates from synchronism, a relay in series with a normally charged condenser in said circuit responsive to the said periodical closure of said circuit for operating said contacts to adjust the speed of said second motor.

4. In a system employing a pair of motor-driven devices which must operate in synchronism, a source of power, a motor for each said device operated from said source of power, means to hold said motors in synchronous operation, comprising a first resistor permanently in series with a first motor to render it definitely slower in operation than a second motor, a second resistor in series with a second motor, contacts for normally shunting said second resistor, a set of pulsing contacts controlled by each said device, the pulsing contacts of said first device being arranged to close later in the cycle of operation of said device than said pulsing contacts of said second device by an amount proportioned to a tolerable deviation from synchronism, a circuit jointly controlled by said sets of pulsing contacts to indicate by open circuit a condition of synchronism and by periodical closed circuit a deviation from synchronism and means responsive to said closed circuit condition for operating said first contacts to adjust the speed of said second motor.

5. In a system employing a pair of motor-driven devices which must operate in synchronism, a source of power, a motor for each said device operated from said source of power, means to hold said motors in synchronous operation, comprising a first resistor permanently in series with a first motor to render it definitely slower in operation than a second motor, a second resistor in series with a second motor, contacts for normally shunting said second resistor, means jointly controlled by said two devices when said devices deviate from synchronism to operate said contacts to change the speed of said second motor, a motor start key for connecting said motors to said source of power, a start key for rendering said devices effectively operative, means controlled by said motor start key for temporarily shunting said resistors, means controlled by said first-mentioned jointly controlled means on a first indication of synchronism thereafter for closing said shunt about said second resistor, and means thereafter responsive to a second indication of synchronism to render said devices effectively operative.

6. In a system employing a pair of motor-driven devices which must operate in synchronism, a source of power, a motor for each said device operated from said source of power, means to hold said motors in synchronous operation, comprising a first resistor permanently in series with a first motor to render it definitely slower in operation than a second motor, a second resistor in series with a second motor, contacts for normally shunting said second resistor, means jointly controlled by said two devices when said devices deviate from synchronism to operate said contacts to change the speed of said second motor, a motor start key for connecting said motors to said source of power, a start key for rendering said devices effectively operative, a first relay responsive to the operation of said start key, a second relay, means controlled by said first-mentioned jointly controlled means on a first indication of synchronism thereby and thereafter for operating said second relay and a third relay responsive to a second indication of synchronism by said first-mentioned jointly controlled means to render said devices effectively operative.

7. In a system employing a pair of motor-driven devices which must operate in synchronism, a source of power, a motor for each said device operated from said source of power, means to hold said motors in synchronous operation comprising means for rendering a first motor definitely slower in operation than a second motor, means for temporarily rendering said second motor slower in operation than said first motor, a set of contacts operated by each said device for closing a circuit during periods when said contacts are in different stages of operation, the said contacts associated with said first motor operating normally later than the said contacts associated with said second motor, an integration device in said circuit for controlling said means for temporarily slowing said second motor, said integration device having operating and releasing characteristics prearranged to operate when said second motor has reached a given degree of lead over said first motor and to then release when in response thereto said second motor has slowed and has reached a like given degree of lag over said first motor.

LINDLEY A. KILLE.

REFERENCES CITED

The following references are of record in the file of this patent:

UNITED STATES PATENTS

| Number | Name | Date |
|---|---|---|
| 2,459,595 | Snyder | Jan. 18, 1949 |
| 2,484,006 | Ankenman et al. | Oct. 11, 1949 |

FOREIGN PATENTS

| Number | Country | Date |
|---|---|---|
| 332,924 | Great Britain | July 30, 1930 |